Oct. 12, 1926.
A. E. COOK
1,602,812
LAND AND WATER CRAFT
Filed August 17, 1925   5 Sheets-Sheet 2
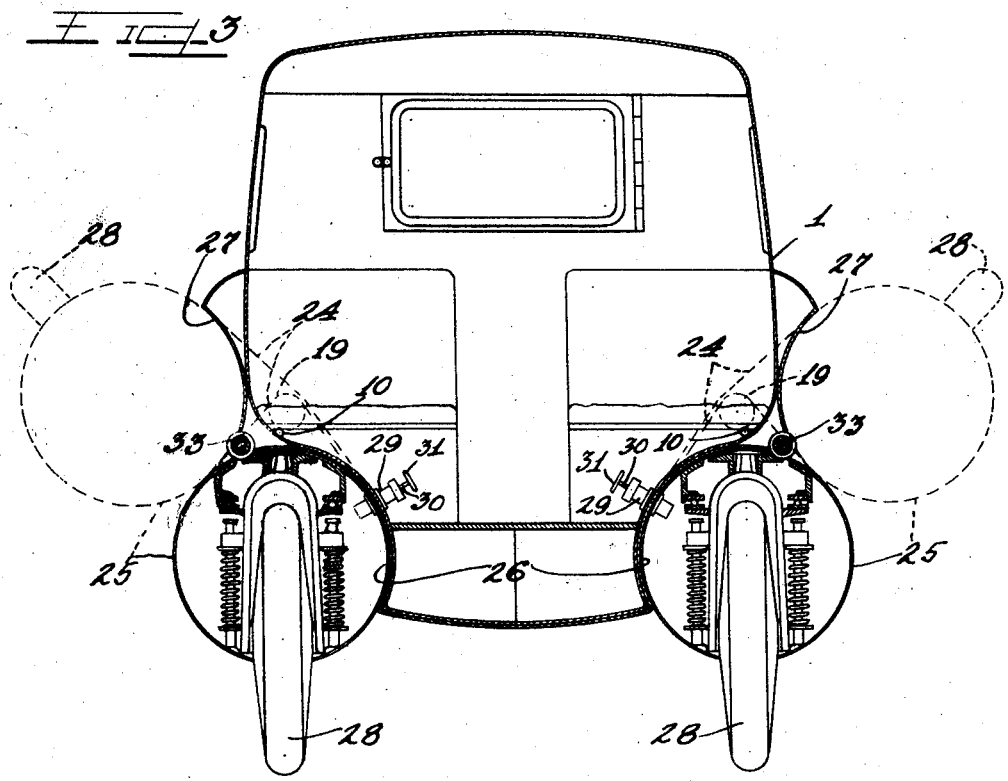
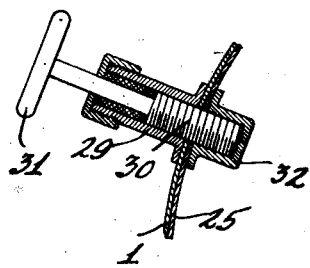
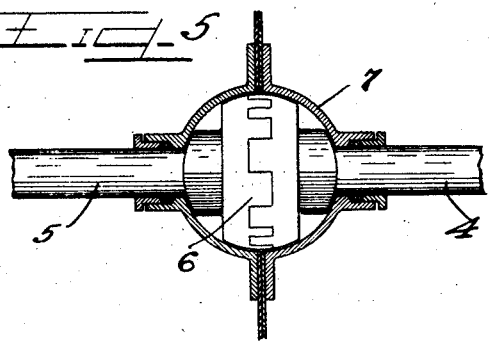
Witnesses
Inventor
Albert E. Cook

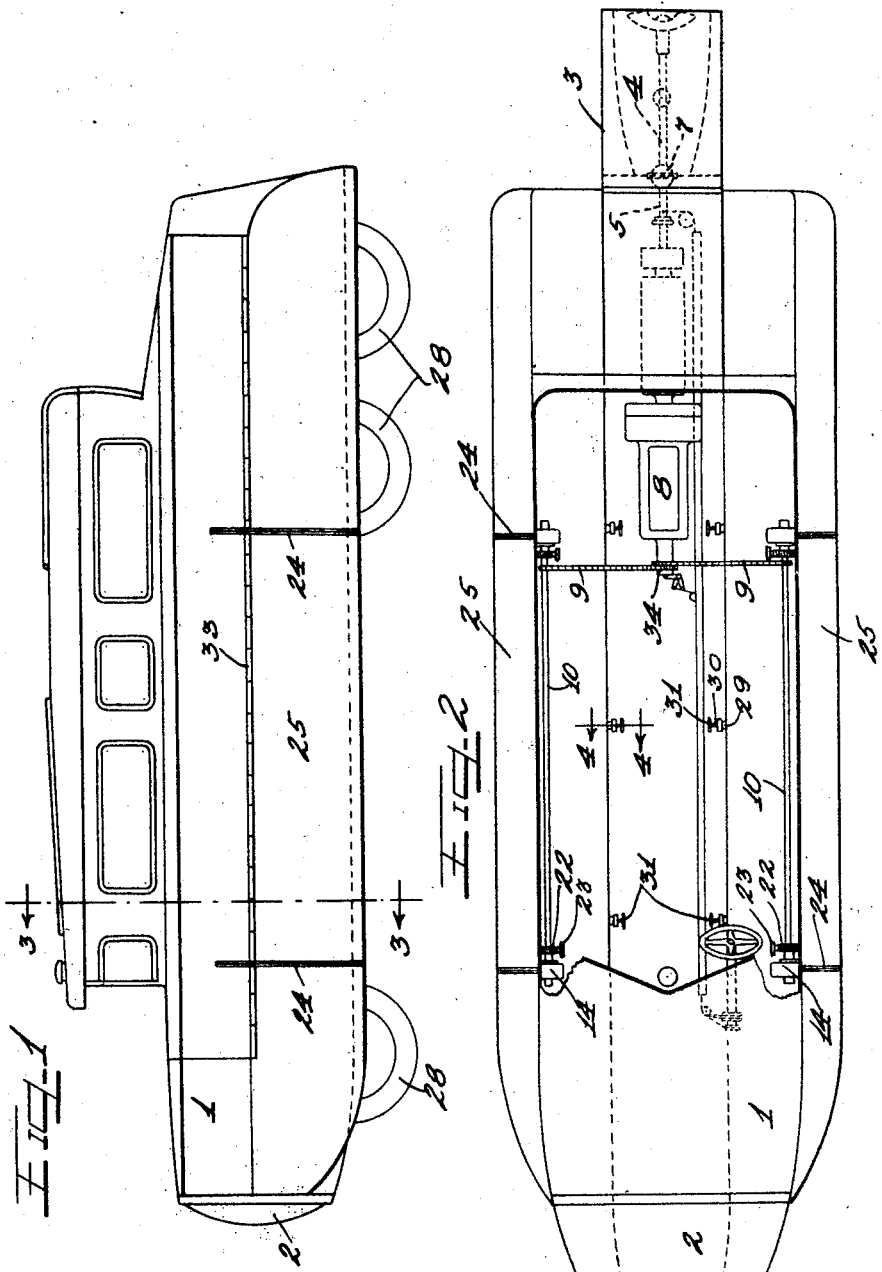

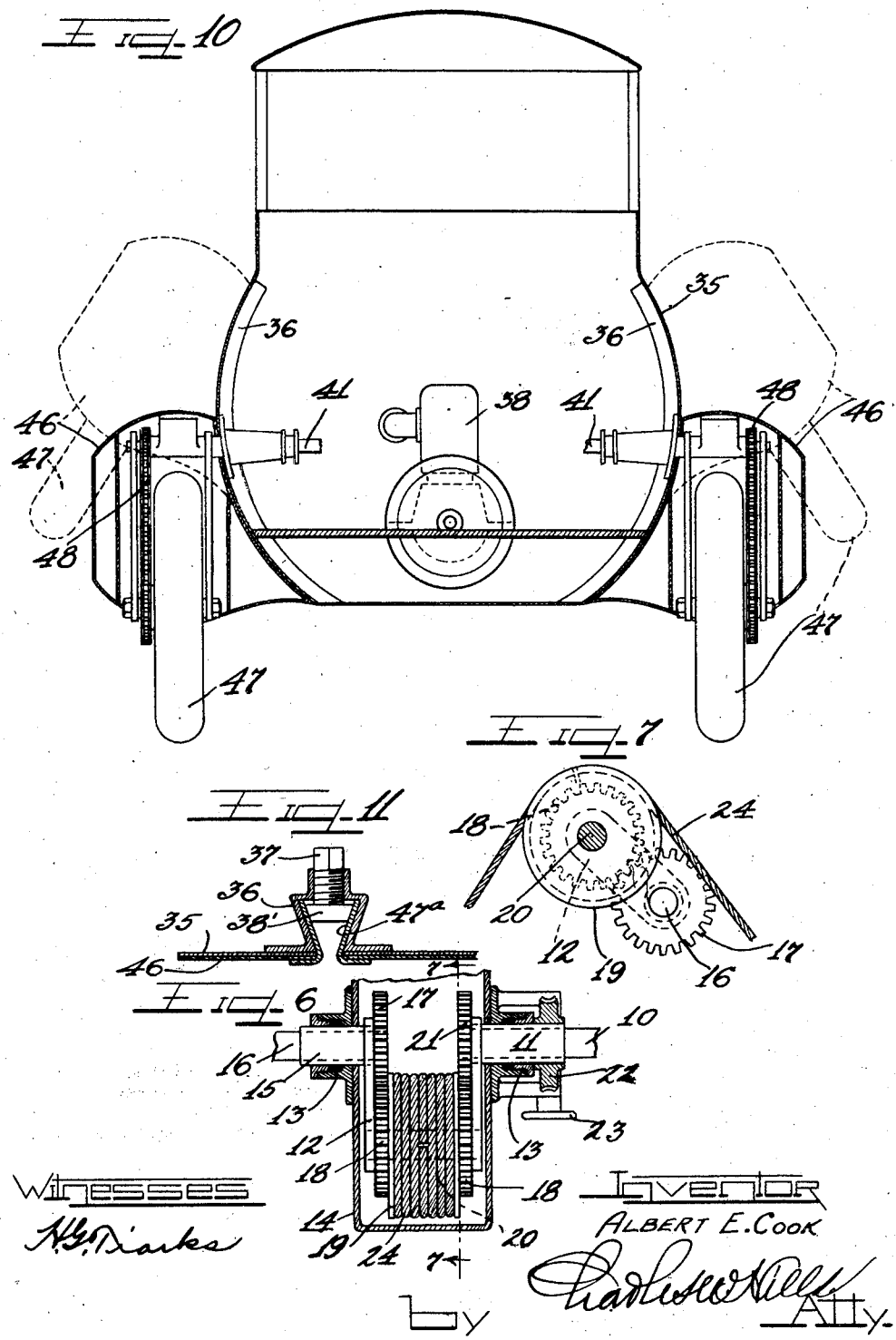

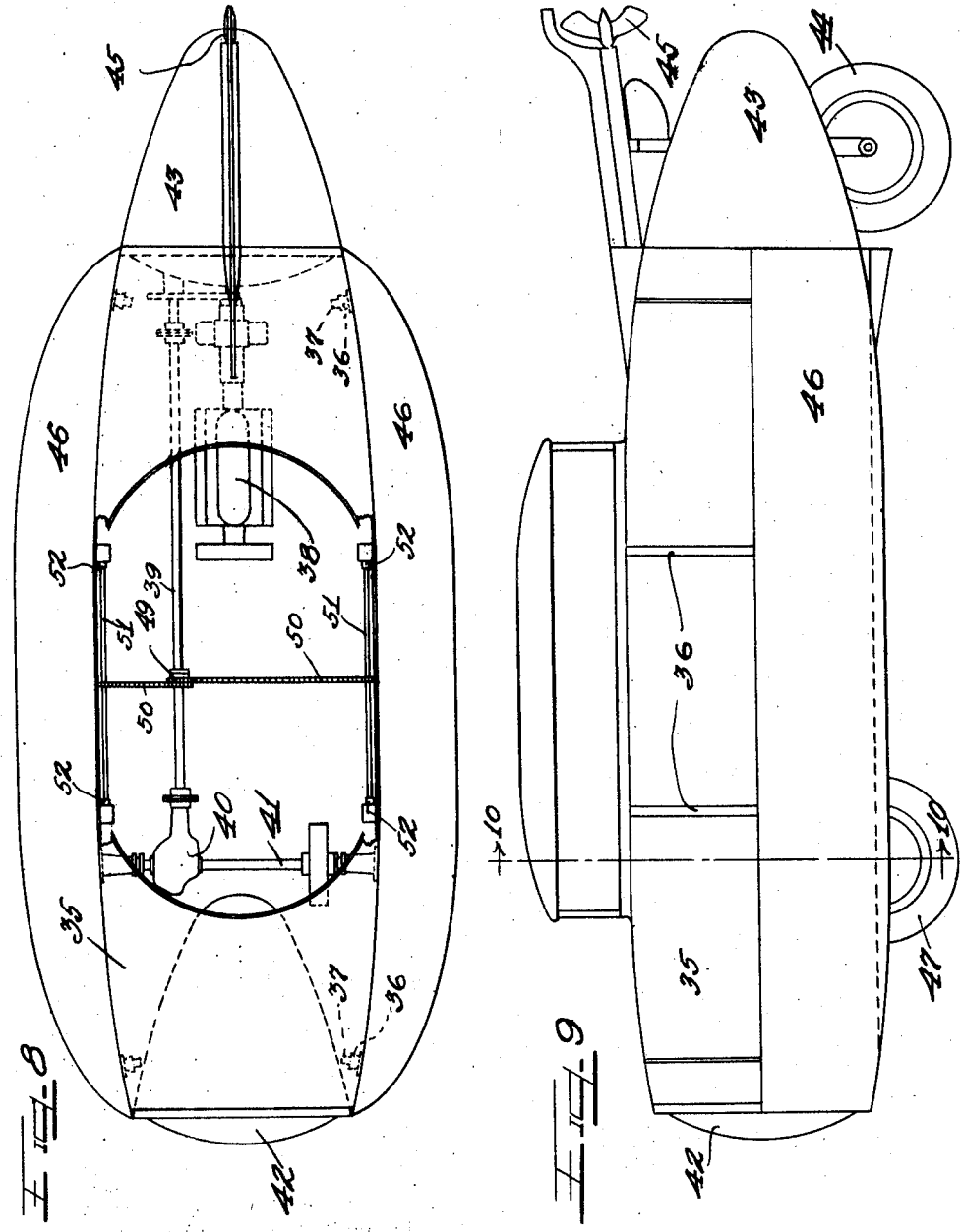

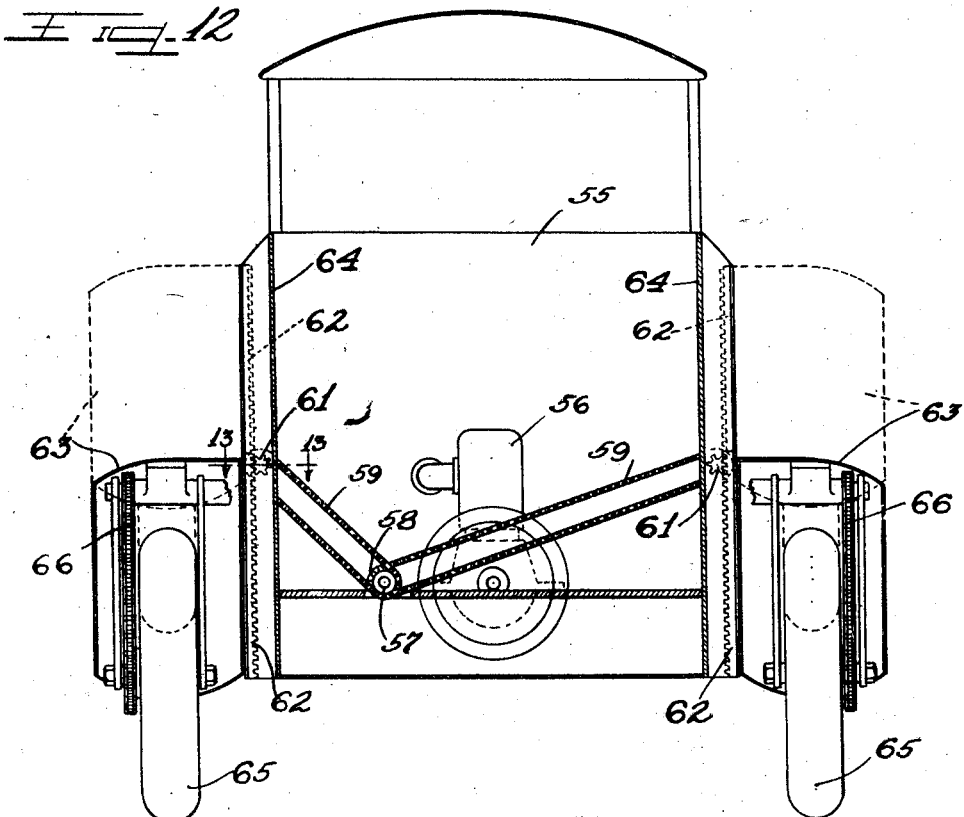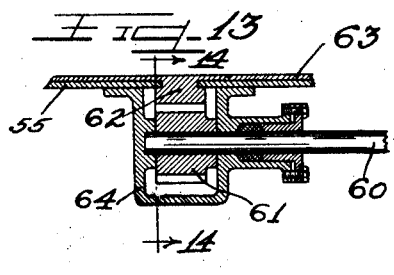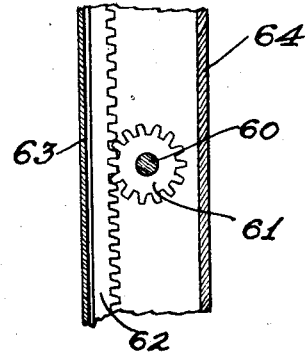

Patented Oct. 12, 1926.

1,602,812

UNITED STATES PATENT OFFICE.

ALBERT E. COOK, OF EVANSTON, ILLINOIS.

LAND AND WATER CRAFT.

Application filed August 17, 1925. Serial No. 50,733.

This invention relates more particularly to land and water crafts provided with improved types of radially and vertically adjustable wheel carrying pontoons, whereby a vehicle when used on water may have the draft thereof changed by merely adjusting the pontoons with respect to the vehicle hull or body.

It is an object of this invention to provide a land and water craft having pontoons adapted to be adjusted from the interior of the craft when in water to change the draft of the craft.

It is also an object of the invention to provide a land and water craft wherein draft varying pontoons are adjustably mounted on the sides of the body of the craft and are provided with wheels adapted for use to support the craft when used on land.

Another object of the invention is to provide the body of a land and water craft with slidably adjustable pontoons for varying the draft of the craft when in the water.

A further object of the invention is to provide a land and water craft wherein the supporting wheels of the craft have the vertical centers thereof disposed to the inside of the pivot points of pontoons adjustably supported on the body of the craft.

It is furthermore an object of this invention to provide a land and water craft having vertically adjustable wheel carrying pontoons slidably mounted thereon.

It is in important object of this invention to provide a land and water craft with a plurality of pontoons mounted upon the body of the craft in such a manner that said pontoons may be secured in predetermined positions to permit the craft to be supported on wheels carried by the pontoons when the craft is used on land, said pontoons also being mounted to permit the same to be vertically adjusted with respect to the body when the craft is in the water to change the draft and increase the stability of the craft.

Other and further important objects of the invention will be apparent from the disclosures in the drawing and specification.

The invention (in a preferred form) is illustrated on the drawings and hereinafter more fully described.

On the drawings:

Figure 1 is a side elevation of a land and water craft embodying the principles of this invention.

Figure 2 is a top plan view thereof with the top removed and parts broken away and showing the body extended for use as a water craft.

Figure 3 is an enlarged transverse section taken on line 3—3 of Figure 1 showing the operation of the pontoons in dotted lines.

Figure 4 is an enlarged fragmentary detail section of a pontoon retaining mechanism taken on line 4—4 of Figure 2.

Figure 5 is an enlarged fragmentary detail section of the clutch driving connection of the propeller shaft.

Figure 6 is an enlarged fragmentary detail section through one of the pontoon adjusting mechanisms.

Figure 7 is a detail view taken on line 7—7 of Figure 6 with parts omitted.

Figure 8 is a top plan view of a modified form of land and water craft with the top removed.

Figure 9 is a side elevation thereof adapted for use as a land vehicle.

Figure 10 is an enlarged transverse section taken on line 10—10 of Figure 9 showing the operations of the pontoons in dotted lines.

Figure 11 is an enlarged fragmentary detail section of the pontoon retaining mechanism.

Figure 12 is a transverse vertical section of another modified form of a land and water craft with parts omitted and parts broken away.

Figure 13 is an enlarged fragmentary detail section taken on line 13—13 of Figure 12.

Figure 14 is a sectional detail view taken on line 14—14 of Figure 13.

As shown on the drawings:

The improved land and water craft comprises a long body or hull 1 provided with an invertible head or bow section 2 and with a propeller section 3. The propeller section 3 is connected to the rear end of the body 1 in any suitable manner to permit the same to be swung into the body 1 when the craft is used as a land vehicle. The inner end of a propeller shaft 4 is removably connected with a drive shaft 5 by means of a clutch mechanism 6 enclosed within a housing 7 as illustrated in Figure 5. The shaft 5 is adapted to be driven from an engine 8. The engine 8 is also provided with connections for driving endless chains or belts 9 which as shown in Figure 2 are trained around sprockets or gears secured on a pair of parallel shafts 10.

The shafts 10 are positioned longitudinally along the inner side walls of the body 1. Each shaft 10 as illustrated in Figure 6 has the ends thereof projecting into sleeves 11 forming parts of cranks 12 which are pivotally supported in bearings 13 of stationary housings 14 which are mounted in the walls of the body 1. The other sleeve 15 of each crank 12 is also journalled in a bearing 13 and is engaged on a stub shaft 16 projecting into the housing 14. A gear 17 is secured on the inner end of the stub shaft 16 and meshes with one of a pair of gears 18 secured to the sides of a drum 19 rotatably mounted upon the crank pin 20. The other gear 18 meshes with a gear 21 secured on the end of the shaft 10. Fixed on the sleeve 11 adjacent the bearing 13 is a worm wheel 22 adapted to be rotated by means of a worm operable by means of a hand wheel 23. An endless rope or cable 24 is secured to and wound on each drum 19.

The cables 24 from the drums are secured to long pontoons 25. The pontoons 25 are disposed longitudinally on the sides of the craft body 1 and normally are seated in lower recesses 26 formed longitudinally along opposite sides of the craft body 1. The body 1 is also provided with upper recesses 27 for receiving the pontoons when in their upper positions of adjustment. Wheels 28 are carried by the pontoons and are adapted to be operated through any desired type of mechanisms driven from the engine 8. The pontoons when in their lower positions as illustrated in Figure 3 are held in place by means of retaining mechanisms illustrated in detail in Figure 4. The body is provided with an internally threaded sleeve 29 having a threaded bolt 30 therein adapted to be operated by means of a hand wheel 31 from the interior of the craft body. The bolts 30 are adapted to be threaded into internally threaded pockets or sockets 32 provided in the pontoons.

The pontoons 25 are pivotally attached to the sides of the craft body 1 by long hinges 33 which are positioned to the outside of the vertical plane of the wheels 28 when the pontoons are in the lowermost position as illustrated in Figure 3. A clutch mechanism 34 is provided at the engine 8 to control the operation of the pontoon adjusting shafts 10 by the endless chains 9. The crank mechanisms 12 are provided for the purpose of relieving the excessive tension on the cables 24 when the pontoons are swung from their lower into their upper positions due to the fact that the pivot center for the pontoons is not the same as the pivot center of cable loops used to adjust the pontoons.

Figures 8 to 11 inclusive disclose a modified form of a land and water craft comprising a body 35 having a curved contour and provided with a plurality of guide channels 36 each equipped with a set bolt 37 each having a beveled head 38'. An engine 38 is mounted within the body 35 and is adapted to transmit a drive, through suitable connections illustrated in dotted lines, (Figure 8), to a drive shaft 39 and a differential 40 to driving axles 41. The body 35 is provided with an invertible head or bow section 42 and with a removable and invertible stern section 43 supporting a steering wheel 44 and a propeller 45.

Disposed on opposite sides of the body 35 are adjustable pontoons 46. Each pontoon 46 has secured thereto a plurality of curved guide rails 47$^a$ of V-shaped cross-section which are slidably engaged in the body guide channels 36 as illustrated in Figure 11. The bolts 37 are adapted to be adjusted from the interior of the body to hold the pontoons secured in a set position of adjustment with respect to the craft body 35. Each pontoon 46 is equipped with a driving wheel 47 adapted to be driven from the axles 41 by connecting mechanisms 48. For the purpose of adjusting the pontoons when the set bolts 37 have been loosened, a clutch mechanism 49 is provided on the drive shaft 39 to permit a drive to be transmitted to endless chains 50 connected to rotate auxiliary shafts 51 mounted longitudinally within the body 35 in suitable bearings 52. The pontoons 46 may be adjusted by any suitable means adapted to be operated by the shafts 51, such as gear and rack means.

Figures 12, 13 and 14 illustrate another modified form of land and water craft comprising a body 55 provided with an engine 56 adapted to transmit a drive when desired to a shaft 57 on which sprocket gears 58 are mounted. Trained around the sprocket gears 58 are endless chains 59 which are connected to rotate auxiliary shafts 60 mounted longitudinally within the craft body. Gears 61 are fixed on the auxiliary shafts 60 and mesh with racks 62 fixed on vertically adjustable pontoons 63. The gears 61 are disposed within guide housings 64 into which the shafts 60 project through suitable packings. Each pontoon 63 is equipped with wheels 65 adapted to receive a drive from the engine 56 through suitable driving mechanism 66 in the pontoons.

The operation is as follows: In the construction illustrated in Figures 1 to 7 inclusive, the pontoons 25 are adapted to be secured in the full line positions of Figure 3 by means of the retaining screws 30 which are operable from the interior of the craft body by means of the hand wheel 31. With the pontoons in their lowermost position as just described, the craft is adapted to be used as a land vehicle with the head or bow section 2 in the position shown in Figure 1 and with the propeller section 3 enclosed within the body 1.

When it is desired to use the craft in water, the bow section 2 may be inverted and placed in the position shown in Figure 2 to increase the length of the craft. The propeller section 3 is also moved into its outer projecting position. The craft may now be run into the water with the pontoons 25 in their lower positions acting to hold the craft in a floating position to permit the same to travel at a high rate of speed and with light draft.

In stormy weather or on a rough body of water, the stability of the craft may be increased to reduce rolling and pitching. To increase the draft of the craft, the hand wheels 31 are first turned to release the pontoons 25. The clutch 34 is then brought into operation to permit a drive from the engine 8 to be transmitted through the chains 9 and the auxiliary shafts 10 to the cable drums 19. With the rotation of the drums 19, the cables 24 are wound to cause the pontoons 25 to swing outwardly and upwardly about the pivot hinges 33 to seat in the body recesses 27 as illustrated in dotted lines in Figure 3. At the time that the pontoons are elevated, the hand wheels 23 are also manually operated to cause the cranks 12 to rotate with respect to the shafts 10 and 16, thereby adjusting the center of swing of the cables as the pontoons swing about their pivots 33. This adjustment of the cranks 12 is used to prevent stretching of the cables 24 due to the different locations of the centers of the cable drums 19 and the centers of the hinges 33. The adjustment of the cranks relieves stretching of the cables and thus compensates for the use of the different centers used in causing movement of the pontoons. The pontoons when in their elevated positions may be secured in place by retaining mechanisms similar to that illustrated in Figure 4 or by other means if so desired.

Attention is directed to the fact that the pontoons 25 are pivoted to swing about points which are disposed to the outside of the planes of the craft wheels 28 thereby affording an arrangement whereby the pontoons 25 when in their lower positions tend to remain seated in the lower recesses 26 of the craft body.

In the modified form of craft illustrated in Figures 8 to 11 inclusive, the pontoons 46 are held secured in their lower positions by means of the set bolts 37 when the craft is to be used on land. The set bolts 37 when turned inwardly act to hold the guide rails 47ª tightly seated in the guide channels 36 of the crank body, thereby holding the pontoons in a set position. The craft may now be used as a land vehicle with the stern section 43 in the position illustrated in Figure 9 to permit the wheel 44 carried by the section 43 to be used as a steering wheel.

If desired, the craft may be run into the water to be used as a motor craft. When this is desired, the head section 42 is reversed and the stern section 43 is rotated or inverted until the steering wheel 44 is uppermost and the propeller mechanism is in its lower position to permit the craft to be propelled thereby when operated by the engine 38. With the pontoons 46 in their lower positions, the craft has but a light draft and may be made to travel at a high rate of speed. To increase the draft and stability of the craft when in the water, the pontoon retaining set bolts 37 are first released after which the clutch 49 is operated to cause a drive from the shaft 39 to be transmitted to the endless chains 50 to rotate the auxiliary shafts 51. Gear and rack means or other suitable devices may be used to cause the released pontoons 46 to be slidably elevated from the full line positions of Figure 10 into the dotted line positions or into any intermediate positions desired. The vertical raising of the pontoons tends to increase the draft of the craft and to make the same more stable. When the pontoons have been raised to the desired heights, they are secured in their adjusted positions by tightening up the set bolts 37.

In the construction disclosed in Figures 12, 13 and 14, the craft may be used on land or in the water. When used as a water craft, the draft may be changed by vertically adjusting the pontoons 63 by means of the gears 61 and the racks 62, said gears adapted to be operated through the shafts 60, and the endless chains 59 from the engine 56. The pontoons 63 may thus be adjusted to any desired position with respect to the craft body 55 to vary the draft of the craft when in the water.

I am aware that numerous details of construction may be varied through a wide range without departing from the principles of this invention, and I therefore do not purpose limiting the patent granted, otherwise than necessitated by the prior art.

I claim as my invention:

1. A land and water craft comprising a body, pontoons on the exterior of the body, power means in the body, and power transmitting mechanisms connected to be driven by the power means for causing vertical adjustment of said pontoons from the interior of the body.

2. A land and water craft comprising a body, pontoons on the exterior thereof, a power means in the body, a plurality of shafts in said body, power transmitting means connecting said shafts to said power means to receive a drive therefrom, and means connecting said pontoons with said shafts to cause vertical adjustment of the pontoons with respect to said body.

3. A land and water craft comprising a body, pontoons thereon, driving mechanisms carried by said pontoons, power means in said body connected to drive said driving mechanisms, and adjusting means adapted to be operated by said power means to cause adjustment of the pontoons when said driving mechanisms are disconnected from said power means.

4. A land and water craft comprising a body, pontoons thereon, mechanisms for holding the pontoons set in adjusted positions, and means operable from the interior of the body for vertically adjusting the pontoons with respect to the body when said mechanisms are released.

5. A land and water craft comprising a body, pontoons thereon, and driving means carried by said pontoons, said pontoons being connected to said body at points outside of the planes of said driving means.

6. A land and water craft comprising a body, and a plurality of pontoons pivotally mounted thereon at points to the outside of the vertical center line of said pontoons.

7. A land and water craft comprising a body, pontoons thereon, and means for adjusting said pontoons, said pontoons when in normal position having the points of connection thereof to the body disposed to the outside of the vertical center lines of the pontoons.

8. A land and water craft comprising a body, power means therein, pontoons on said body, means carried by said pontoons adapted to receive a drive from the driving power means, adjusting means for said pontoons, and a clutch device adapted to be operated to cause the adjusting means to be operated by said power means to cause adjustment of the pontoons with respect to said body.

9. A land and water craft comprising a body, pontoons pivotally mounted thereon, mechanisms for adjusting said pontoons with respect to said body, and means for adjusting said mechanisms when the pontoons are being adjusted.

10. A land and water craft comprising a body, pontoons adjustably secured thereto, cables connected to said pontoons, means for operating said cables to cause adjustment of the pontoons with respect to said body, and mechanisms for setting said means to obviate stretching of the cables.

11. A land and water craft comprising a body, pontoons adjustably mounted thereon, cables connected to said pontoons, drums on which said cables are adapted to be wound, cranks for supporting said drums, mechanisms for operating said drums to cause adjustment of the pontoons with respect to said body, and means for adjusting said cranks to prevent stretching of the cables.

In testimony whereof I have hereunto subscribed my name.

ALBERT E. COOK.